US008258479B2

(12) United States Patent
Menge (10) Patent No.: US 8,258,479 B2
(45) Date of Patent: Sep. 4, 2012

(54) RADIATION DETECTION SYSTEM AND METHOD OF MAKING A RADIATION DETECTION SYSTEM

(75) Inventor: Peter R. Menge, Chagrin Falls, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 105 days.

(21) Appl. No.: 12/967,986

(22) Filed: Dec. 14, 2010

(65) Prior Publication Data
US 2011/0139991 A1    Jun. 16, 2011

Related U.S. Application Data

(60) Provisional application No. 61/286,514, filed on Dec. 15, 2009.

(51) Int. Cl.
*G01T 1/20* (2006.01)
(52) U.S. Cl. .................................. 250/361 R
(58) Field of Classification Search ............... 250/361 R
See application file for complete search history.

(56) References Cited

U.S. PATENT DOCUMENTS

| | | | |
|---|---|---|---|
| 4,700,074 A * | 10/1987 | Bosnjakovic | 250/363.02 |
| 4,990,785 A | 2/1991 | Logan | |
| 5,012,103 A | 4/1991 | Tanaka et al. | |
| 5,226,995 A | 7/1993 | White | |
| 6,429,414 B1 | 8/2002 | Spahn | |
| 6,979,826 B2 | 12/2005 | Ikhlef | |
| 7,078,702 B2 | 7/2006 | Ringermacher et al. | |
| 7,247,858 B2 | 7/2007 | De Keyser | |
| 7,405,408 B2 | 7/2008 | Vogtmeier et al. | |
| 2005/0016950 A1 | 1/2005 | Andreaco et al. | |
| 2010/0294415 A1* | 11/2010 | Frank | 156/64 |
| 2010/0294943 A1* | 11/2010 | Frank | 250/367 |

OTHER PUBLICATIONS

The International Search Report and the Written Opinion for International Application No. PCT/US2010/060315 received from the International Searching Authority (ISA/KR) dated Jul. 28, 2011, 10 pages.

* cited by examiner

*Primary Examiner* — David Porta
*Assistant Examiner* — Marcus Taningco
(74) *Attorney, Agent, or Firm* — Abel Law Group, LLP; Christopher J. Cianciolo (57) ABSTRACT

A radiation detection system can include a first scintillator having a first edge extending between a first surface and a second surface of the first scintillator. The radiation detection system can also include a second scintillator having a second edge extending between a third surface and a fourth surface of the second scintillator. The first edge of the first scintillator can be coupled to the second edge of the second scintillator. In a particular embodiment, a first portion of the first scintillator and a second portion of the second scintillator can both lie along a line that is perpendicular to the first surface of the first scintillator. In another embodiment, an optical coupling material can be coupled between the first edge and the second edge.

20 Claims, 6 Drawing Sheets

RADIATION DETECTION SYSTEM AND METHOD OF MAKING A RADIATION DETECTION SYSTEM

CROSS-REFERENCE TO RELATED APPLICATION

This application claims priority under 35 U.S.C. §119(e) to U.S. Patent Application No. 61/286,514 entitled "Radiation Detection System and Method of Making a Radiation Detection System," by Menge, filed Dec. 15, 2009, which is assigned to the current assignee hereof and incorporated herein by reference in its entirety.

FIELD OF THE DISCLOSURE

The present disclosure is directed to radiation detection systems and methods of making and using such systems.

RELATED ART

Radiation detection systems are used in a variety of applications. For example, some medical imaging technologies use arrays of scintillators and photosensors to produce images. The photosensors can determine the intensity of scintillation light produced by different scintillators. The extent to which the photosensors can accurately determine such intensity can contribute to the accuracy of images produced by a medical imaging apparatus. Accordingly, the industry continues to need improvements in radiation detection systems.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Figure 3:
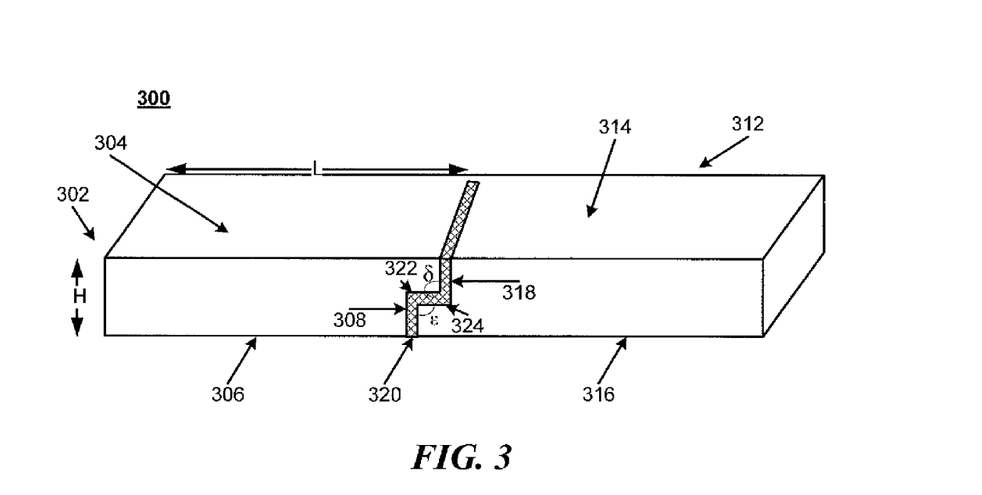

As described herein, a scintillator has a length, a width, and a height. The length refers to a dimension of a surface of a scintillator that is measured perpendicular to a thickness of the scintillator. An example of a length is illustrated in FIG. 3. A width of the scintillator refers to a dimension of the surface measured perpendicular to the length. A height of the scintillator refers to a thickness of the scintillator that is measured perpendicular to both the length and width of the surface. An example of a height is illustrated in FIG. 3. As described herein, "lateral" and "laterally" refers to extension in a direction along a plane defined by the length and the width of a scintillator and perpendicular to the height of the scintillator.

Some industrial applications can require a radiation detection system to cover a large area. For instance, in some medical imaging technologies, the radiation detection system can need to cover an area of 0.3 $m^2$ (3 $ft^2$) or greater. It can be challenging to grow some scintillator crystals this large. Smaller scintillator plates can be produced and pieced together to form a desired total size. A plurality of photosensors can receive scintillation light from the scintillator plates, and the intensity of light received at each photosensor can be used to identify a plate at which particular scintillation light was produced. For instance, readings from three photosensors can be used to triangulate a location at which particular scintillation light was produced. These determinations can be used to build up a desired image.

Figure 1:
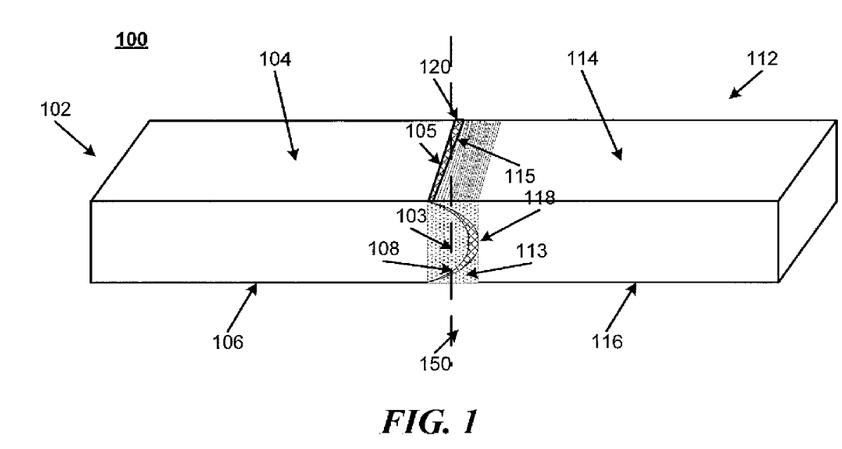
FIG. 1 is a diagram illustrating a particular embodiments of a radiation detection system.

FIG. 1 illustrates a particular embodiment of a radiation detection system 100. The system 100 includes a scintillator 102 and another scintillator 112. Each of the scintillators 102 and 112 can include a solid scintillating material, such as a scintillator crystal material. In a particular embodiment, the radiation detection system 100 can include a plurality of scintillator plates that includes the scintillators 102 and 112, and the scintillator plates can be coupled to effectively form a larger scintillator.

In an example, each of the scintillators 102 and 112 can be a scintillator plate having a greatest dimension, such as a length, a diameter, or a diagonal dimension, of from approximately 5 cm to approximately 25 cm. The scintillator plates can be coupled to effectively form a larger scintillator, such as a 50 cm by 50 cm scintillator or another size of scintillator. Though the scintillators 102 and 112 are illustrated as rectangles, those skilled in the art will recognize that each scintillator plate can be substantially rectangular, triangular (for example, illustrated in FIG. 4), polyhedral (for example, illustrated in FIG. 5) or another suitable shape that allows multiple scintillator plates to be coupled to each other. In one embodiment, each scintillator plate can be substantially square.

In a further example, each of the scintillators 102 and 112 can be relatively thin. For instance, each of the scintillators 102 and 112 can have a height, or thickness, from approximately 0.5 cm to approximately 2.5 cm. Each of the scintillators 102 and 112 can include a substantially solid scintillating material, such as a sodium iodide, a lanthanum bromide, a bismuth germanate, a gadolinium silicate, a lutetium yttrium orthosilicate, a cesium lithium yttrium chloride elpasolite, a cesium iodide, a scintillating plastic or another suitable material. The scintillating material may include a suitable dopant, such as cesium, titanium, thallium, or another suitable dopant.

The scintillator 102 can include a surface 104 and an opposing surface 106. For instance, the surfaces 104 and 106 can include a top surface and a bottom surface of the scintillator 102. Additionally, the scintillator 102 can include an edge 108 that extends from the surface 104 to the opposing surface 106. Due to the shape of the edge 108, a hypothetical line 150 (illustrated as a dashed line) can extend through a portion 103 of the scintillator 102 (illustrated as the dotted portion of the scintillator 102). The hypothetical line 150 can be substantially perpendicular to the surface 104. For instance, as illustrated in FIG. 1, the edge 108 can define a curve.

The other scintillator 112 can include a surface 114 and an opposing surface 116. For instance, the surfaces 114 and 116 can include a top surface and a bottom surface of the other scintillator 112. The other scintillator 112 can also include an edge 118 that extends from the surface 114 to the opposing surface 116. The hypothetical line 150 can extend through a portion 113 of the scintillator 112 (illustrated as the dotted portion of the scintillator 112). The hypothetical line 150 can be substantially perpendicular to the surface 114. For instance, as illustrated in FIG. 1, the edge 118 can also define a curve.

The edge 108 can be coupled to the edge 118. The edge 108 can define a curve that is substantially complementary to the curve defined by the edge 118, such that a joint is formed when the edges 108 and 118 are coupled. For instance, the edge 108 can be substantially convex or substantially concave relative to the edge 118, and the edge 118 can be the other of substantially convex or substantially concave relative to the edge 108. An elevation of the surface 104 can be above an elevation of the surface 116 and at or below an elevation of the surface 114. In a particular embodiment, the surfaces 104 and 114 can be substantially coplanar when the edges 108 and 118 are coupled.

Further, as illustrated in FIG. 1, a part of the edge 108 of the scintillator 102 can extend laterally beyond an end 105 of the surface 104. Conversely, a part of the edge 118 of the scintillator 112 may not extend laterally to an end 115 of the surface 114. In a particular embodiment, a part of the edge 118 may not extend laterally to each of the ends of the surfaces 114 and 116.

In a particular embodiment, an optical coupling material 120 can be disposed and coupled between the edges 108 and 118. In the example illustrated in FIG. 1, the optical coupling material can define a curve. The optical coupling material can include epoxy, silicone rubber, another optical coupling material, another adhesive, or any combination thereof. In a particular embodiment, the optical coupling material can be from approximately 0.1 mm to approximately 0.5 mm thick.

FIGS. 2-6 illustrate other particular embodiments of radiation detection systems, in which edges of the scintillators, as well as optical coupling materials, have various shapes that include portions lying along lines that are substantially perpendicular to a surface, such as a top or bottom surface, of a scintillator. These shapes and embodiments are intended as examples only and are described merely to illustrate, and not limit, the concepts described herein.

Figure 2:
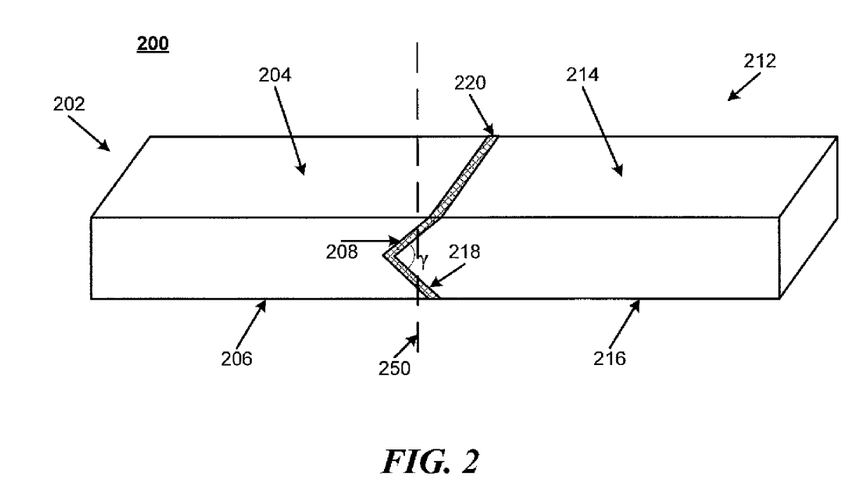
FIGS. 2-6 are diagrams illustrating other particular embodiments of a radiation detection systems.

For example, FIG. 2 illustrates another particular embodiment of a radiation detection system 200. The system 200 includes a scintillator 202 and another scintillator 212. The scintillator 202 can include a surface 204 and an opposing surface 206. The other scintillator 212 can include a surface 214 and an opposing surface 216. Additionally, the scintillator 202 can include an edge 208 that extends from the surface 204 to the opposing surface 206. The other scintillator 212 can also include an edge 218 that extends from the surface 214 to the opposing surface 216 and that is coupled to the edge 208. An optical coupling material 220 can be coupled between the edges 208 and 218.

The scintillators 202 and 212 can each include a portion that lies along a line 250 that is perpendicular to the surface 204, the surface 214, or a combination thereof. In the embodiment illustrated in FIG. 2, segments of the edge 208 intersect to form an angle, $\gamma$, which can be from approximately 60 degrees to approximately 120 degrees. For instance, the angle, $\gamma$, can be from approximately 45 degrees to approximately 135 degrees. In a particular embodiment, the angle, $\gamma$, can be substantially 90 degrees. Segments of the other edge 218, and segments of the optical coupling material 220, can also intersect to form angles substantially equal to the angle, $\gamma$. A part of the edge 218 of the scintillator 212 can extend laterally beyond an end of the surface 214, and a part of the edge 208 of the scintillator 202 may not extend laterally to an end of the surface 204. In a particular embodiment, a part of the edge 208 may not extend laterally to each of the ends of the surfaces 204 and 206.

In another example, FIG. 3 illustrates another particular embodiment of a radiation detection system 300. The system 300 includes a scintillator 302 having an edge 308 and another scintillator 312 having an edge 318. In an embodiment, each of the edges 308 and 318 can include a plurality of segments that intersect at corners. That is, the edges 308 and 318 are not defined by continuous functions. An optical coupling material 320 can be coupled between the edges 308 and 318. In the embodiment illustrated in FIG. 3, the scintillators 302 and 312 can each include portions that lie on a line perpendicular to the surface 304. For example, the edge 308 can include a substantially horizontal segment that is substantially parallel to the surfaces 304 and 314. For instance, the edge 308 can include a horizontal segment 322 that is shorter than a length, L, of the scintillator 302. In a particular embodiment, the horizontal segment 322 can be as long as a height, H, of the scintillator 302. The edge 318 can also include a horizontal segment 324 that may have any of the lengths described with respect to the horizontal segment 322.

In addition, the edge 308 can include a vertical segment that is shorter than a height, H, of the scintillator 302, such as the vertical segment that forms a substantially 90-degree angle, $\delta$, with the horizontal segment 322. The edge 318 can also include a vertical segment that is shorter than a height of the scintillator 312, such as the vertical segment that forms a substantially 90-degree angle, $\epsilon$, with the horizontal segment 324.

In a particular embodiment, from a cross-sectional view, the horizontal segment 322 can be longer than a vertical segment. For example, the horizontal segment 322 can be from approximately 1.5 to approximately 3 times as long as a vertical segment. In another embodiment, the horizontal segment 322 can be approximately equal in length to the height, H, of the scintillator 302.

As illustrated in FIG. 3, the edges 308 and 318, and the optical coupling material 320, can each include a plurality of substantially right angles, such as two right angles, spaced apart from those formed at the surfaces 304, 306, 314 and 316. Additional right angles may be used to create, for instance, a stair-step pattern.

A part of the edge 318 of the scintillator 312 can extend laterally beyond an end of the surface 314, and a part of the edge 308 of the scintillator 302 may not extend laterally to an end of the surface 304. In a particular embodiment, a part of the edge 308 may not extend laterally to each of the ends of the surfaces 304 and 306, wherein such ends lie adjacent to the optical coupling material 320.

Figure 4:
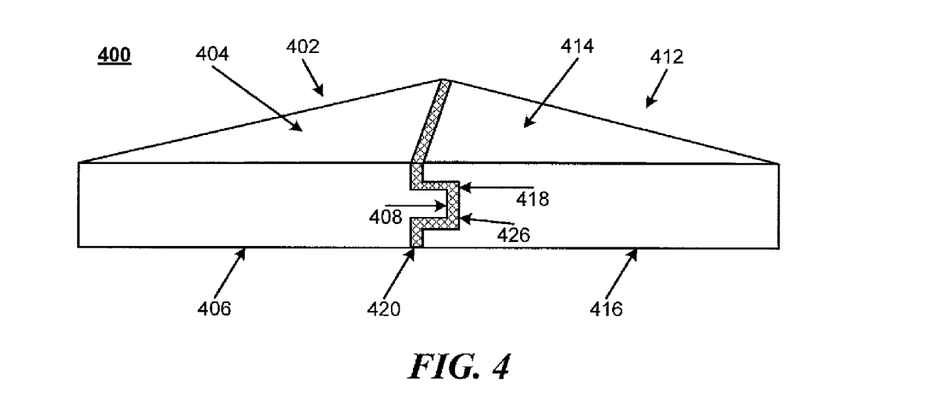

In a further example, FIG. 4 illustrates another particular embodiment of a radiation detection system 400. The system 400 includes a scintillator 402 having an edge 408 and another scintillator 412 having an edge 418. As illustrated, the scintillators 402 and 412 can have a non-rectangular shape, such as a triangular shape. An optical coupling material 420 can be coupled between the edges 408 and 418. In the embodiment illustrated in FIG. 4, the edges 408 and 418, and the optical coupling material 420, can each include a plurality of substantially horizontal segments that are substantially parallel to the surfaces 404 and 414. In addition, the edges 408 and 418 and the optical coupling material 420 can include a plurality of vertical segments, which may include a vertical segment 426 that does not touch the surfaces 404, 406, 414, and 416. As a result, the edges 408 and 418, and the optical coupling material 420, can each include a plurality of substantially right angles, such as four right angles, other than those formed at the surfaces 404, 406, 414, and 416. A part of the edge 418 of the scintillator 412 can extend laterally beyond an end of the surface 414, and a part of the edge 408 of the scintillator 402 may not extend laterally to an end of the surface 404. In a particular embodiment, a part of the edge 408 may not extend laterally to each of the ends of the surfaces 404 and 406.

Figure 5:
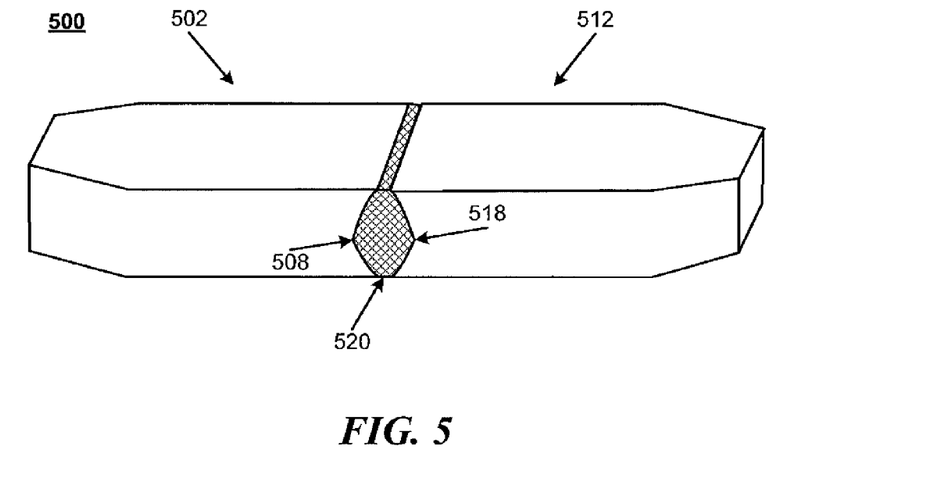

In yet another example, FIG. 5 illustrates another particular embodiment of a radiation detection system 500. As illustrated, the scintillators 502 and 512 can have a non-rectangular shape, such as a polyhedral shape. The system 500 includes a scintillator 502 having an edge 508 and another scintillator 512 having an edge 518. Each of the edges 508 and 518 can be ground, polished, etched, or otherwise smoothed on the scale of one mm. An optical coupling material 520 can be coupled between the edges 508 and 518. In the embodiment illustrated in FIG. 5, the edges 508 and 518 can be shaped such that they are not complementary to one another. Instead, the edges 508 and 518 can be shaped to allow a particular shape of optical coupling material. For instance, the optical coupling material 520 can be substantially lens-shaped when coupled between the edges 508 and 518. The edges 508 and 518 can be substantially convex, as illustrated in FIG. 5. In another embodiment, the edges 508 and 518 can be substantially concave.

Figure 6:
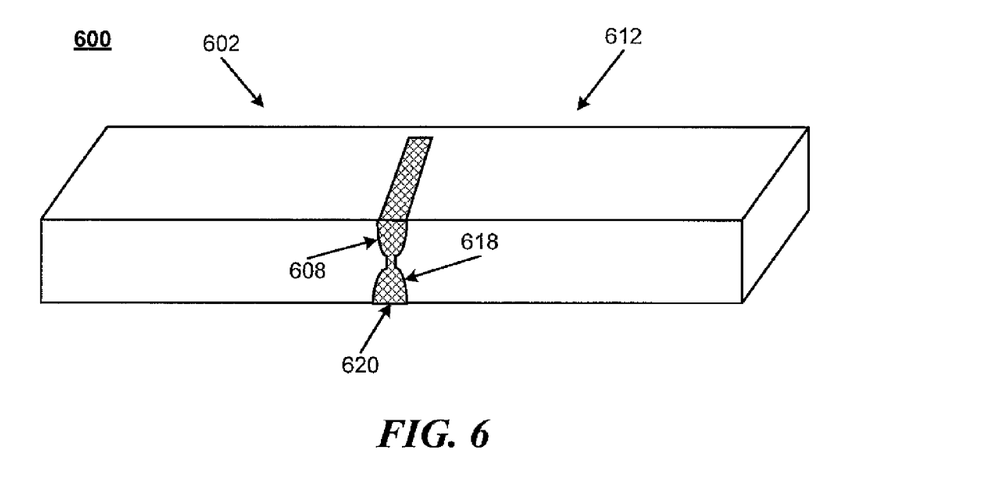

In still another example, FIG. 6 illustrates another particular embodiment of a radiation detection system 600. The system 600 includes a scintillator 602 having an edge 608 and another scintillator 612 having an edge 618. Each of the edges 608 and 618 can be ground, polished, etched, or otherwise smoothed on the scale of one mm. An optical coupling material 620 can be coupled between the edges 608 and 618. In the embodiment illustrated in FIG. 6, the edges 608 and 618 can be shaped such that they are not complementary to one another. Instead, the edges 608 and 618 can be shaped to allow a particular shape of optical coupling material. For instance, the edges 608 and 618 can each have a curved portion, a vertical portion, a horizontal portion or any combination thereof. In the example illustrated in FIG. 6, the edges 608 and 618 can be shaped such that the optical coupling material 620 is substantially hourglass-shaped when coupled between the edges 608 and 618.

Figure 7:
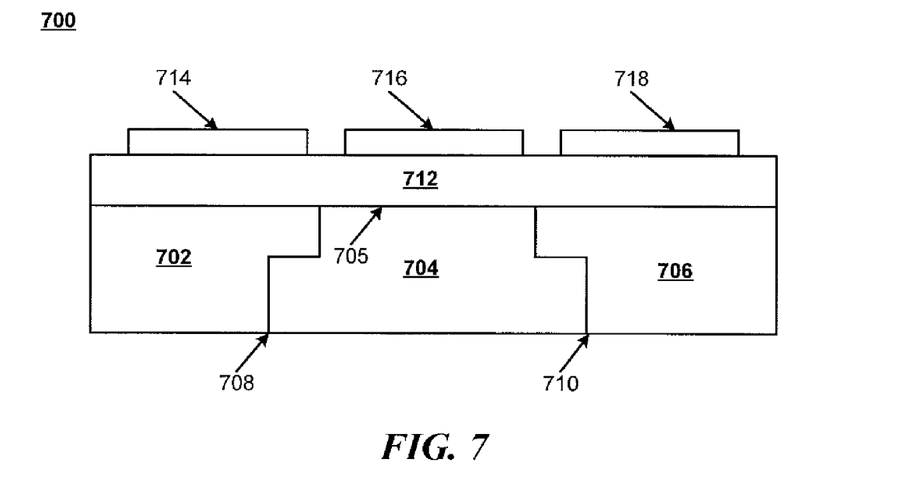
FIGS. 7-8 are diagrams illustrating additional particular embodiments of a radiation detection systems.
Figure 8:
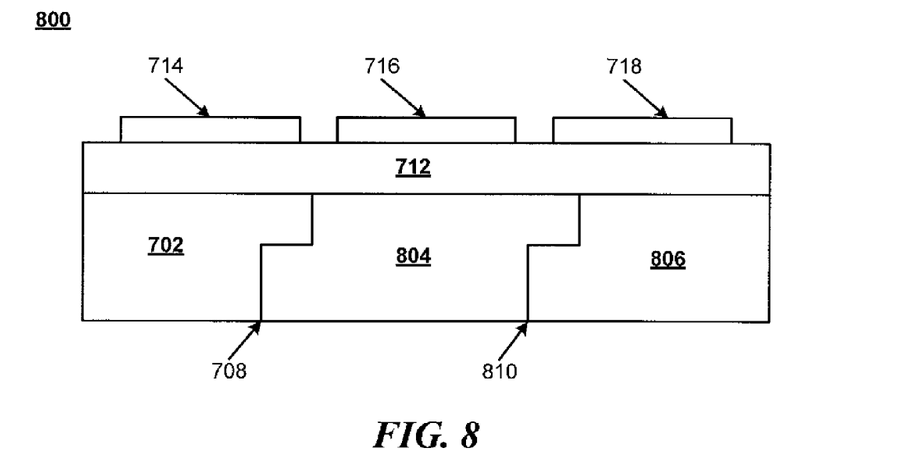

FIGS. 7 and 8 illustrate particular embodiments of a radiation detection system 700. The system 700 includes a plurality of scintillators 702, 704, and 706 coupled via optical coupling materials 708 and 710. In a particular embodiment, a window 712 can be coupled to the scintillators 702, 704, and 706. The window can include glass, alumina, spinel, a polymer or another suitable transparent or translucent material. Photosensors 714, 716, and 718 are coupled, via the glass window 712, to the scintillators 702, 704, and 706, respectively. Each photosensor can include, for example, a photodiode, a photomultiplier tube, a silicon photomultiplier (SiPM), a hybrid PMT having a photocathode and a semiconductor electron detector, or another suitable photosensor.

Each scintillator includes a portion that lies along a line that is perpendicular to a surface 705 of the scintillator 704, for example. As illustrated in FIG. 7, the shape of the edges can vary for a particular scintillator. For instance, the scintillator 704 can have differently shaped edges, such that the shape of the optical coupling material 708 differs from the shape of the optical coupling material 710. Alternatively, as illustrated in FIG. 8, the shapes of the edges of the scintillator 704 can be substantially the same as illustrated in FIG. 8. In FIG. 8, the shapes of the scintillators 804 and 806 and optical coupling material 810 are different as compared the shapes of the scintillators 704 and 706 and optical coupling material 710 in FIG. 7. The scintillators 804 and 806 can have substantially the same composition or different compositions as compared to the scintillators 704 and 706, respectively. The optical coupling material 810 can have substantially the same composition or different compositions as compared to the optical coupling material 710.

Figure 9:
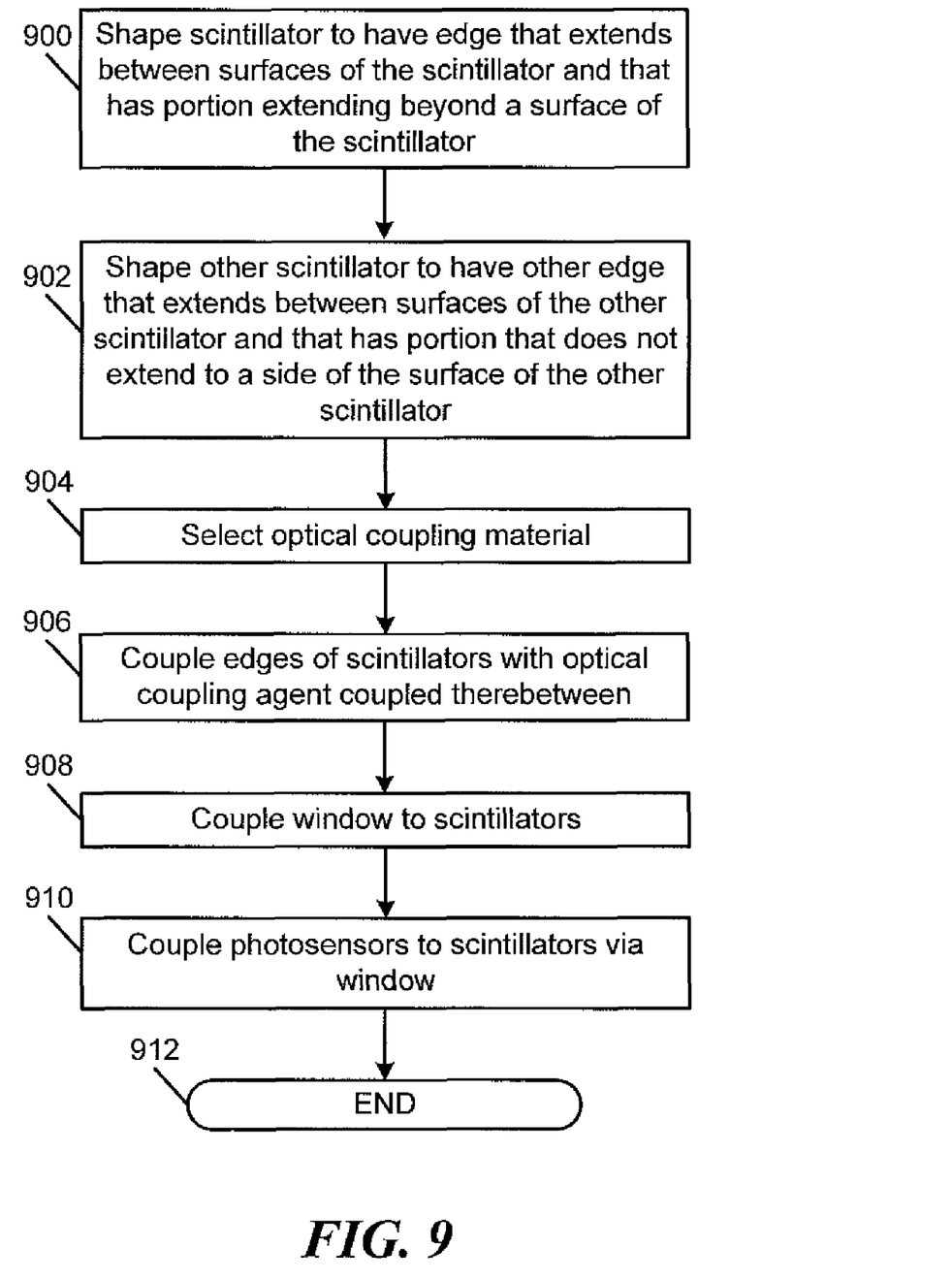
FIG. 9 is a flow diagram illustrating a particular embodiment of a method of making a radiation detection system.

FIG. 9 illustrates a particular embodiment of a method of making a radiation detection system. At 900, a scintillator is shaped to have an edge that extends between surfaces of the scintillator, such as two opposing surfaces of the scintillator. A part of the edge of the scintillator can extend laterally beyond an end of a surface of the scintillator. Moving to 902, another scintillator is shaped to have another edge that extends between surfaces of the other scintillator. A part of the other edge of the other scintillator may not extend laterally to an end of a surface of the other scintillator. In a particular embodiment, a part of the other edge may not extend laterally to each of the ends of the surfaces of the other scintillator, wherein such ends lie adjacent to an optical coupling material that is coupled between the scintillators, as described herein.

The scintillators can be shaped using a variety of techniques. In an example, a scintillating material can be molded to produce a substantially solid scintillator having an edge that includes a portion that is not perpendicular to a surface of the scintillator. In a further example, an end of a scintillator can be cut or etched to include an edge having a portion that is not perpendicular to a surface of the scintillator. If needed or desired, the edge may be ground or polished before coupling edge to another edge of another scintillator.

Proceeding to 904, in a particular embodiment, an optical coupling material can be selected. For example, the optical coupling material can be selected based on a refractive index of the material, of a scintillating material, or any refractive index between such materials. The optical coupling material may be selected, for instance, such that its refractive index substantially matches or is a particular mismatch to a refractive index of a scintillating material. Continuing to 906, the edges of the scintillators can be coupled with an optical coupling material coupled therebetween. Advancing to 908, a window can be coupled to the scintillators. Moving to 910, photosensors can be coupled to the scintillators via the window. The method can terminate at 912.

In accordance with particular embodiments disclosed herein, a radiation detection system is provided that can include a first scintillator having a first edge extending between a first surface and a second surface of the first scintillator, and a second scintillator having a second edge extending between a third surface and a fourth surface of the second scintillator. The first edge of the first scintillator can be coupled to the second edge of the second scintillator. A first portion of the first scintillator and a second portion of the second scintillator can both lie along a line that is perpendicular to the first surface of the first scintillator.

Figure 10:
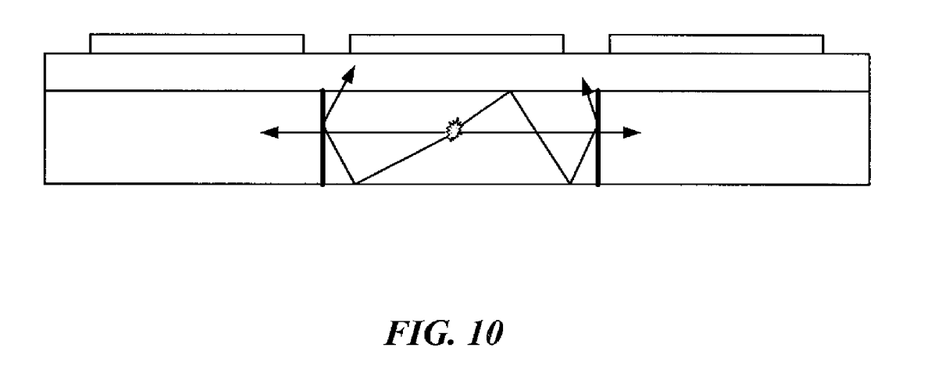
FIGS. 10-11 illustrate light spreading in particular embodiments of radiation detection systems.

Scintillators that are coupled via edges that have portions as described herein can increase the amount of scintillation light that reaches photosensors included in the radiation detection system. For instance, as illustrated in FIG. 10, when such edges are substantially vertical, scintillation photons with large vertical components may not pass through an optical coupling material coupled between the edges. These photons may instead stay within the scintillator and not pass to a neighboring crystal. This lack of light spreading can cause distortion in an image produced based on the scintillation light, because the photosensors are not able to triangulate a source of particular scintillation light.

Figure 11:
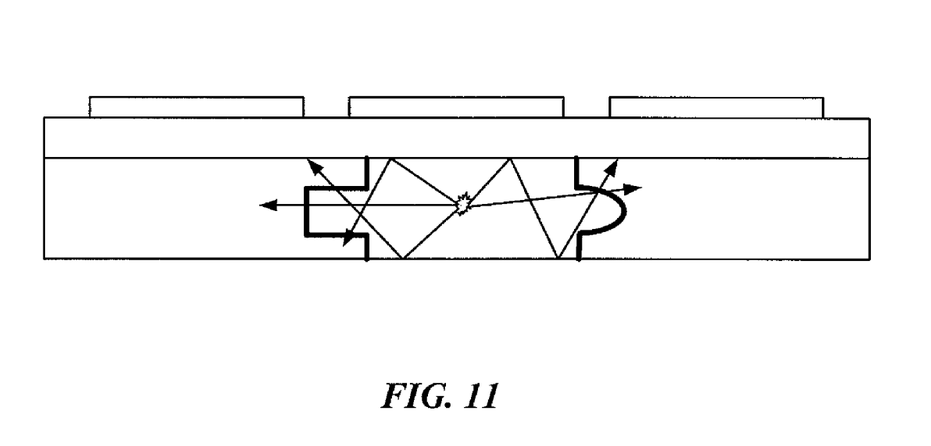

On the other hand, as illustrated in FIG. 11, if edges of the scintillators include a non-vertical portion, such as a horizontal segment, photons with large vertical components can pass through the optical coupling material to another scintillator. This increases light spreading and reduces image distortion. In a non-limiting example, approximately 58% of light can cross into neighboring scintillators when substantially vertical edges are used. In contrast, approximately 63% of light can cross when a horizontal segment is used. This can be a significant improvement, particularly because light spreading in a single large monolithic crystal may only produce an image that corresponds to 73% of light into substantially equivalent volumes of scintillators.

Many different aspects and embodiments are possible. Some of those aspects and embodiments are described below. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

According to a first aspect, a radiation detection system can include a first scintillator having a first edge extending between a first surface and a second surface of the first scintillator. The radiation detection system can also include a second scintillator having a second edge extending between a third surface and a fourth surface of the second scintillator. The first edge of the first scintillator can be coupled to the second edge of the second scintillator. Additionally, a hypothetical line extends through a first portion of the first scintillator and a second portion of the second scintillator, wherein the line is perpendicular to the first surface of the first scintillator. An elevation of the first surface can be above an elevation of the fourth surface and at or below an elevation of the third surface.

In an embodiment of the first aspect, the first edge can include segments that intersect to form an angle of from approximately 45 degrees to approximately 135 degrees. For example, the angle can be from approximately 60 degrees to approximately 120 degrees. In a particular embodiment, the angle can be substantially 90 degrees.

In another embodiment of the first aspect, the first edge can include a substantially horizontal segment and a substantially vertical segment. From a cross-sectional view, a length of the substantially horizontal segment can be shorter than a length of the first scintillator, and a height of the substantially vertical segment shorter than a height of the first scintillator. For instance, from a cross-sectional view, a length of the substantially horizontal segment can be longer than the substantially vertical segment. In another embodiment of the first aspect, from a cross-sectional view, the substantially horizontal segment can be approximately as long as a height of the first scintillator. In another embodiment of the first aspect, the second edge can include a substantially horizontal portion and a substantially vertical portion. From a cross-sectional view, the substantially horizontal portion can be shorter than a length of the second scintillator. A height of the substantially vertical portion can be shorter than a height of the second scintillator.

In another embodiment of the first aspect, the first edge can include a part that defines a curve. The curve can be substantially convex relative to the second edge. Alternatively, the curve can be substantially concave relative to the second edge.

In another embodiment of the first aspect, the first edge can include a shape that is complementary to a shape of the second edge, such that a joint is formed when the first edge is coupled to the second edge.

In another embodiment of the first aspect, an optical coupling material can be disposed between the first edge and the second edge. In another embodiment of the first aspect, the optical coupling material can include an epoxy or a silicone rubber.

In another embodiment of the first aspect, a first photosensor can be coupled to the first scintillator and a second photosensor can be coupled to the second scintillator. In another embodiment of the first aspect, the first and third surfaces can be substantially coplanar. In another embodiment of the first aspect, the first and third surfaces can lie along different substantially parallel planes.

According to a second aspect, a radiation detection system can include a first scintillator having a first edge extending from a first surface to a second surface of the first scintillator. The radiation detection system can also include a second scintillator having a second edge extending from a third surface to a fourth surface of the second scintillator. The first edge of the first scintillator can be coupled to the second edge of the second scintillator. An optical coupling material can be coupled between the first edge and the second edge and includes a portion that defines a curve.

In an embodiment of the second aspect, the optical coupling material can be substantially lens-shaped and can be disposed between the first edge and the second edge. In another embodiment of the second aspect, the optical coupling material can be substantially convex. In another embodiment of the second aspect, the optical coupling material can be substantially concave.

According to a third aspect, a method can include shaping a first scintillator to have a first edge extending between a first surface and a second surface of the first scintillator. The first and second surfaces can be substantially parallel. A part of the first edge can extend beyond an end of the first surface. The method can also include shaping a second scintillator to have a second edge extending between a third surface and a fourth surface of the second scintillator. The third and fourth surfaces can be substantially parallel. A part of the second edge may not extend to an end of the third surface. The method can also include coupling the first edge of the first scintillator to the second edge of the second scintillator.

In an embodiment of the third aspect, an elevation of the first surface can be above an elevation of the fourth surface and at or below an elevation of the third surface.

In another embodiment of the third aspect, the first edge and the second edge can each include segments that intersect to form an angle of from approximately 45 degrees to approximately 135 degrees. For example, the angle can be from approximately 60 degrees to approximately 120 degrees. In a particular embodiment, the angle can be substantially 90 degrees.

In another embodiment of the third aspect, the first edge can include a portion that defines a curve.

In another embodiment of the third aspect, the method can include disposing an optical coupling material between the first edge and the second edge. The optical coupling material can have a first segment and a second segment continuous with the third portion. The first segment and the second segment can intersect to form an angle of from approximately 45 degrees to approximately 135 degrees.

In another embodiment of the third aspect, the method can include selecting the optical coupling material based on a refractive index of the first scintillator, the second scintillator, or any refractive index between that of the first scintillator and the second scintillator.

In another embodiment of the third aspect, shaping can include molding a scintillating material to form the first scintillator including first edge or to form the second scintillator including the second edge. In another embodiment of the third aspect, shaping can include cutting or etching a substantially solid scintillating material to form the first edge or the second edge. In another embodiment of the third aspect, the method can include grinding or polishing the first edge, the second edge or any combination thereof, before coupling the first edge to the second edge.

In another embodiment of the third aspect, the method can include coupling a first photosensor to the first scintillator and coupling a second photosensor to the second scintillator. In another embodiment of the third aspect, the method can include coupling a window between the first and second scintillators and the first and second photosensors.

Note that not all of the activities described above in the general description or the examples are required, that a portion of a specific activity may not be required, and that one or more further activities may be performed in addition to those described. Still further, the order in which activities are listed is not necessarily the order in which they are performed.

In a particular embodiment, a method may be described in a series of sequential actions. The sequence of the actions and the party performing the actions may be changed without departing from the scope of the teachings unless explicitly stated to the contrary. Actions may be added, deleted, or altered. Also, a particular action may be iterated. Further, actions within a method that are disclosed as being performed in parallel may be performed serially, and other actions within a method that are disclosed as being performed serially may be performed in parallel.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection system comprising:
a first scintillator having a first edge extending from a first surface to a second surface of the first scintillator;
a second scintillator having a second edge extending from a third surface to a fourth surface of the second scintillator;
wherein:
the first edge of the first scintillator is coupled to the second edge of the second scintillator;
a hypothetical line extends through a first portion of the first scintillator and a second portion of the second scintillator, wherein the line is perpendicular to the first surface of the first scintillator; and
an elevation of the first surface is above an elevation of the fourth surface and at or below an elevation of the third surface.

2. The radiation detection system of claim 1, wherein the first edge includes segments that intersect to form an angle of from approximately 45 degrees to approximately 135 degrees.

3. The radiation detection system of claim 2, wherein the angle is substantially 90 degrees.

4. The radiation detection system of claim 3, wherein the first edge includes a substantially horizontal segment and a substantially vertical segment, and wherein, from a cross-sectional view, a length of the first substantially horizontal portion is shorter than a length of the first scintillator, and a height of the substantially vertical portion is shorter than a height of the first scintillator.

5. The radiation detection system of claim 1, wherein the first edge includes a part that defines a curve.

6. The radiation detection system of claim 1, wherein the first edge includes a shape that is complementary to a shape of the second edge, such that a joint is formed when the first edge is coupled to the second edge.

7. The radiation detection system of claim 1, wherein an optical coupling material is disposed between the first edge and the second edge.

8. The radiation detection system of claim 1, wherein a first photosensor is coupled to the first scintillator and a second photosensor is coupled to the second scintillator.

9. The radiation detection system of claim 1, wherein the first and third surfaces are substantially coplanar.

10. A radiation detection system comprising:
a first scintillator having a first edge extending from a first surface to a second surface of the first scintillator; and
a second scintillator having a second edge extending from a third surface to a fourth surface of the second scintillator;
wherein:

the first edge of the first scintillator is coupled to the second edge of the second scintillator;

an optical coupling material is coupled between the first edge and the second edge and includes a portion that defines a curve.

11. The radiation detection system of claim 10, wherein the optical coupling material is substantially lens-shaped and is disposed between the first edge and the second edge.

12. A method comprising:

shaping a first scintillator to have a first edge extending between a first surface and a second surface of the first scintillator, wherein the first and second surfaces are substantially parallel, and wherein a part of the first edge extends laterally beyond an end of the first surface;

shaping a second scintillator to have a second edge extending between a third surface and a fourth surface of the second scintillator, wherein the third and fourth surfaces are substantially parallel, and wherein a part of the second edge does not extend laterally to an end of the third surface; and coupling the first edge of the first scintillator to the second edge of the second scintillator.

13. The radiation detection system of claim 12, wherein the first edge includes segments that intersect to form an angle of from approximately 45 degrees to approximately 135 degrees.

14. The radiation detection system of claim 13, wherein the angle is substantially 90 degrees.

15. The method of claim 12, further comprising disposing an optical coupling material between the first edge and the second edge.

16. The method of claim 15, further comprising selecting the optical coupling material based on a refractive index of the first scintillator, the second scintillator or any refractive index between that of the first scintillator and the second scintillator.

17. The method of claim 12, wherein shaping includes molding a scintillating material to form the first scintillator including the first edge or to form the second scintillator including the second edge.

18. The method of claim 12, wherein shaping includes cutting or etching a substantially solid scintillating material to form the first edge or the second edge.

19. The method of claim 18, further comprising grinding or polishing the first edge, the second edge or any combination thereof, before coupling the first edge to the second edge.

20. The method of claim 12, further comprising coupling a first photosensor to the first scintillator and coupling a second photosensor to the second scintillator.

* * * * *